United States Patent
Amoli et al.

(10) Patent No.: US 11,518,371 B2
(45) Date of Patent: Dec. 6, 2022

(54) METHOD AND SYSTEM SUPPORTING OBTAINING OF BODY PARAMETERS OF A PERSON OUTSIDE A VEHICLE

(71) Applicant: Volvo Car Corporation, Gothenburg (SE)

(72) Inventors: Alborz Sedaghat Amoli, Gothenburg (SE); Florian Wachter, Gothenburg (SE); Thilak Rathinavelu, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 203 days.

(21) Appl. No.: 16/791,999

(22) Filed: Feb. 14, 2020

(65) Prior Publication Data
US 2020/0269836 A1    Aug. 27, 2020

(30) Foreign Application Priority Data

Feb. 21, 2019 (EP) .................................. 19158562

(51) Int. Cl.
*B60W 30/08* (2012.01)
*B60Q 1/46* (2006.01)
(Continued)

(52) U.S. Cl.
CPC .............. *B60W 30/08* (2013.01); *B60Q 1/46* (2013.01); *B60W 10/30* (2013.01); *G06V 20/58* (2022.01); *G06V 40/103* (2022.01); *G06V 40/20* (2022.01)

(58) Field of Classification Search
None
See application file for complete search history.

(56) References Cited

U.S. PATENT DOCUMENTS

| 7,983,450 B2 * | 7/2011 | Higgins .................. G06F 3/017 701/2 |
| 9,731,645 B1 * | 8/2017 | Taleb-Bendiab ............................ G08G 1/096716 |

(Continued)

FOREIGN PATENT DOCUMENTS

EP     2674914 A1    12/2013

OTHER PUBLICATIONS

Chen et al., "Sensor-Assisted Facial Recognition: An Enhanced Bio-Metric Authenticated System for Smartphones," MobiSys'14, Jun. 2014, 14 pp.

(Continued)

*Primary Examiner* — Dale W Hilgendorf
(74) *Attorney, Agent, or Firm* — Shumaker & Sieffert, P.A.

(57) ABSTRACT

The present disclosure relates to a method performed by a body parameters supporting system of a vehicle for supporting obtaining body parameters of a person. The body parameters supporting system determines—with input from one or more surrounding detecting sensors adapted to capture a surrounding exterior of the vehicle—one or more body parameters capturing conditions for a person present outside the vehicle. The body parameters supporting system further communicates one or more instruction signals indicating one or more body motion and/or obstruction removal instructions, wherein the one or more instruction signals are determined in consideration of counteracting, changing and/ or overcoming at least one of the one or more body parameters capturing conditions. The disclosure also relates to a body parameters supporting system in accordance with the foregoing, and a vehicle comprising such a body parameters supporting system.

16 Claims, 4 Drawing Sheets

(51) Int. Cl.
  *B60W 10/30*  (2006.01)
  *G06V 20/58*  (2022.01)
  *G06V 40/10*  (2022.01)
  *G06V 40/20*  (2022.01)

(56) References Cited

U.S. PATENT DOCUMENTS

| | | | |
|---|---|---|---|
| 10,571,285 B2* | 2/2020 | Wang | G08G 1/096805 |
| 2009/0092284 A1 | 4/2009 | Breed et al. | |
| 2014/0218186 A1* | 8/2014 | Kawamoto | G01S 13/04 |
| | | | 340/426.1 |
| 2014/0306814 A1 | 10/2014 | Ricci | |
| 2015/0251599 A1* | 9/2015 | Koravadi | B60W 30/08 |
| | | | 340/903 |
| 2016/0144867 A1* | 5/2016 | Delp | B60W 30/181 |
| | | | 701/28 |
| 2017/0153714 A1* | 6/2017 | Gao | G06V 40/20 |
| 2017/0305335 A1* | 10/2017 | Wei | B60Q 1/50 |
| 2018/0136643 A1* | 5/2018 | Tao | G05D 1/0231 |
| 2018/0174460 A1* | 6/2018 | Jung | G06V 40/10 |
| 2018/0326982 A1* | 11/2018 | Paris | G08G 1/166 |
| 2018/0329418 A1* | 11/2018 | Baalke | G05D 1/0246 |
| 2018/0330617 A1* | 11/2018 | Wei | B60Q 5/006 |
| 2019/0039617 A1* | 2/2019 | Miura | B60W 40/09 |
| 2019/0098469 A1* | 3/2019 | Oh | H04W 4/44 |
| 2019/0106052 A1* | 4/2019 | Delgado | B60Q 1/503 |
| 2019/0138007 A1* | 5/2019 | Baghsorkhi | G08G 1/091 |
| 2019/0184893 A1* | 6/2019 | Sorokin | B60Q 1/503 |
| 2019/0193728 A1* | 6/2019 | Tanaka | G01S 17/931 |
| 2019/0273817 A1* | 9/2019 | Ueno | H04W 4/48 |
| 2019/0283746 A1* | 9/2019 | Shalev-Shwartz | G05D 1/0221 |
| 2020/0156538 A1* | 5/2020 | Harper | B60Q 5/006 |
| 2020/0264622 A1* | 8/2020 | Tokumochi | B60Q 1/46 |
| 2021/0043013 A1* | 2/2021 | Tatara | B60Q 1/50 |
| 2021/0276561 A1* | 9/2021 | Hayakawa | B62D 15/0255 |
| 2021/0312796 A1* | 10/2021 | Lull | G01C 21/3461 |
| 2021/0380137 A1* | 12/2021 | Domeyer | B60W 30/09 |
| 2021/0394793 A1* | 12/2021 | Austin | G08G 1/056 |

OTHER PUBLICATIONS

European Search Report issued in European Application No. 19158562.9 dated May 28, 2019, 3 pp.

Communication pursuant to Article 94(3) EPC from counterpart European Application No. 19158562.9 dated Sep. 22, 2022, 6 pp.

* cited by examiner

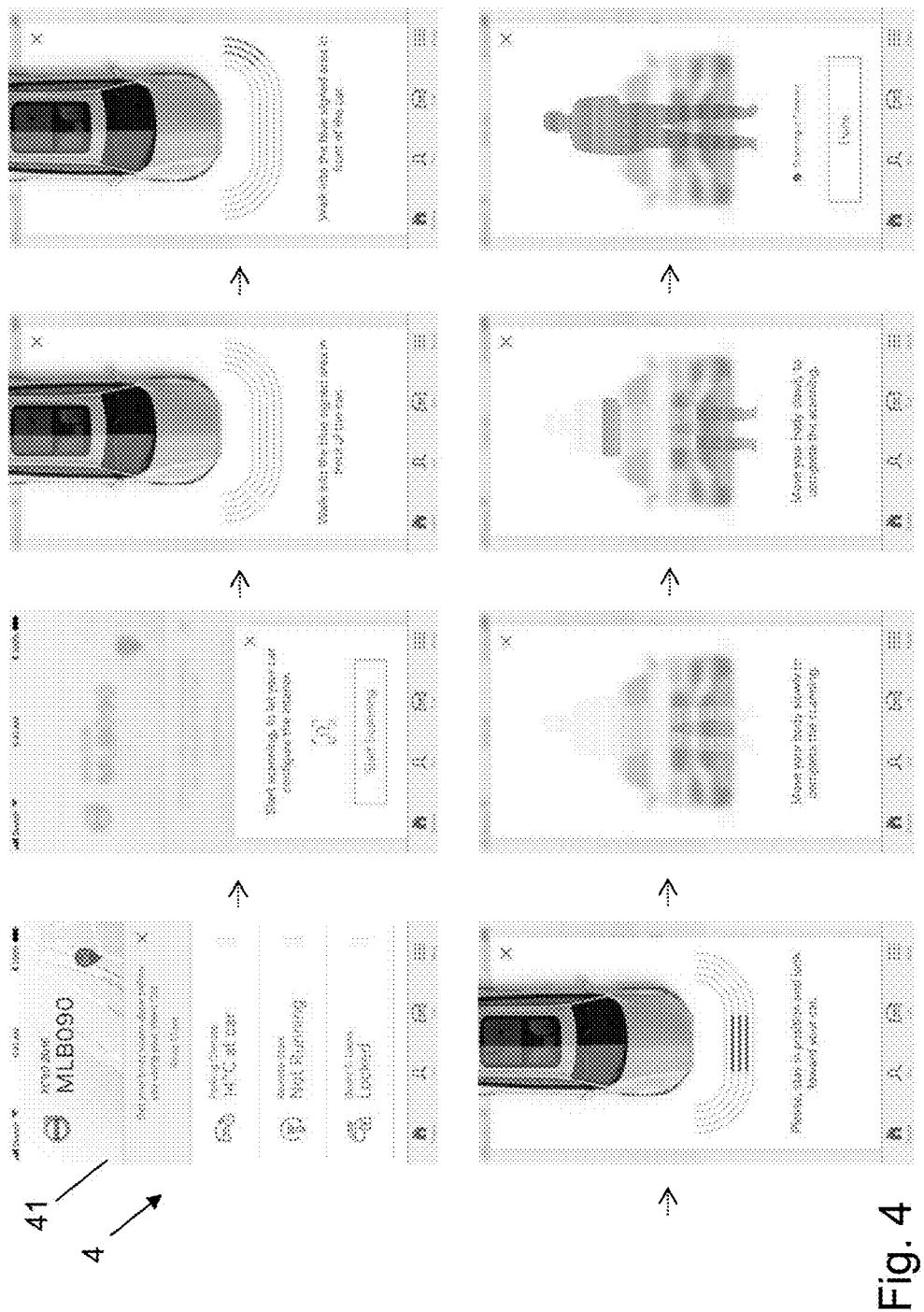

METHOD AND SYSTEM SUPPORTING OBTAINING OF BODY PARAMETERS OF A PERSON OUTSIDE A VEHICLE

CROSS REFERENCE

This application claims priority to European Application Number 19158562.9 filed Feb. 21, 2019, the entire contents of which are hereby incorporated by reference.

TECHNICAL FIELD

The present disclosure relates to supporting obtaining of body parameters of a person outside a vehicle, e.g. of a potential vehicle occupant.

BACKGROUND

Vehicle occupants come in many different shapes and sizes, and commonly, vehicles of today offer the ability to adjust adjustable vehicle components—such as e.g. seat position(s), seat belt position(s), mirror position(s), airbag position(s), steering wheel position(s), display position(s) etc.—to suit different body proportions.

For instance, an internal and/or external e.g. camera may capture body parameters of a vehicle occupant or potential vehicle occupant, and said body parameters may then be utilized for adjusting adjustable vehicle components.

EP 2 674 914 A1, for instance, relates to determining a body parameter of a person, e.g. a body height or leg length of a future occupant of a vehicle, and further discloses how said body parameter may be used for adjusting an adjustable component of the vehicle such as e.g. a position of a seat or steering wheel. However, although EP 2 674 914 A1 is set out to determine body parameters of a future vehicle occupant, even when the body of said vehicle occupant is obscured by clothes, there is still room for improvements and/or alternative solutions when it comes to obtaining body parameters of a person, for instance of a potential vehicle occupant.

SUMMARY OF THE INVENTION

It is therefore an object of embodiments herein to provide an approach for supporting obtaining of body parameters of a person, such as a potential vehicle occupant, in an improved and/or alternative manner.

According to a first aspect of embodiments herein, the object is achieved by a method performed by a body parameters supporting system of a vehicle for supporting obtaining of body parameters of a person. The body parameters supporting system determines with input from one or more surrounding detecting sensors adapted to capture a surrounding exterior of the vehicle, one or more body parameters capturing conditions for a person present outside the vehicle. The body parameters supporting system further communicates one or more instruction signals indicating one or more body motion and/or obstruction removal instructions, wherein the one or more instruction signals are determined in consideration of counteracting, changing and/or overcoming at least one of the one or more body parameters capturing conditions.

According to a second aspect of embodiments herein, the object is achieved by a body parameters supporting system for—and/or adapted for—supporting obtaining of body parameters of a person. The body parameters supporting system comprises a conditions determining unit for—and/or adapted for—determining, with input from one or more surrounding detecting sensors adapted to capture a surrounding exterior of the vehicle, one or more body parameters capturing conditions for a person present outside the vehicle. The body parameters supporting system further comprises an instructions communicating unit for—and/or adapted for—communicating one or more instruction signals indicating one or more body motion and/or obstruction removal instructions, wherein the one or more instruction signals are determined in consideration of counteracting, changing and/or overcoming at least one of the one or more body parameters capturing conditions.

According to a third aspect of embodiments herein, the object is achieved by a vehicle comprising the discussed body parameters supporting system.

According to a fourth aspect of embodiments herein, the object is achieved by a computer program product comprising a computer program containing computer program code means arranged to cause a computer or a processor to execute the steps of the discussed body parameters supporting system, stored on a computer-readable medium or a carrier wave.

Thereby, there is introduced an approach according to which measures are provided to assist in obtaining human body dimensions and/or proportions, e.g. of a potential vehicle occupant. That is, since there is determined with input from one or more surrounding detecting sensors adapted to capture a surrounding exterior of the vehicle, one or more body parameters capturing conditions for a person present outside the vehicle, there may be established prevailing conditions for capturing body parameters of a human in the field of view of at least a first sensor adapted to sense a surrounding outside the vehicle. In other words, a check is carried out of circumstances e.g. obstructions for obtaining body parameters of a person. Subsequently it may be derived from the body parameters capturing conditions for instance whether one or more body parameters are not possible to capture, obtain and/or determine, and/or whether one or more body parameters are not possible to capture, obtain and/or determine to an extent deemed sufficient. Moreover, that is, since there is communicated one or more instruction signals indicating one or more body motion and/or obstruction removal instructions, wherein the one or more instruction signals are determined in consideration of counteracting, changing and/or overcoming at least one of the one or more body parameters capturing conditions, the body parameters supporting system may provide guidance prompting the person to perform body motion(s) and/or obstruction(s) removal as a measure to counteract, change and/or overcome prevailing circumstances, which circumstances for instance may be deemed unsatisfying and/or insufficient, for capturing body parameter(s). Accordingly, the person may be guided how to move, act and/or behave—and/or which potential obstruction(s) to remove—to improve the circumstances under which body parameters with support from the one or more surrounding detecting sensors may be obtained and/or determined. Thus, provided that the person at least partly follows at least one of the one or more instructions, body parameter(s) which were previously not possible to obtain and/or determine—and/or not possible to obtain and/or determine sufficiently—may then potentially be obtainable and/or determinable.

For that reason, an approach is provided for in an improved and/or alternative manner support obtaining of body parameters of a person, such as of a potential vehicle occupant.

The technical features and corresponding advantages of the above mentioned method will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which:

FIG. 4 illustrates exemplifying guidance provided on a display of an optional user device, associated with exemplifying signals transmitted from and/or received by the body parameters supporting system according to embodiments of the disclosure.

DETAILED DESCRIPTION

Figure 1:
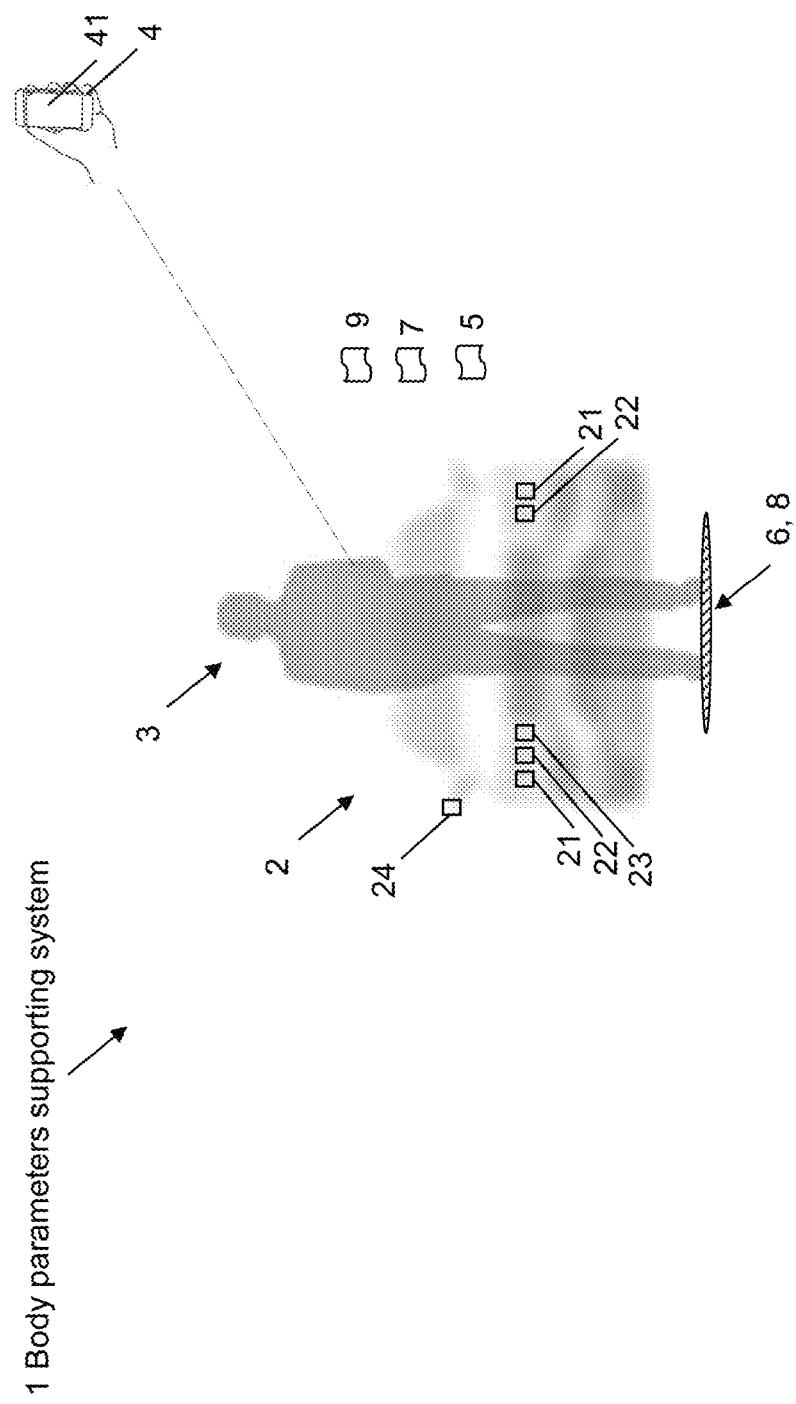
FIG. 1 illustrates a schematic view of an exemplifying body parameters supporting system of a vehicle according to embodiments of the disclosure.

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to supporting obtaining of body parameters of a person, there will be disclosed an approach according to which measures are provided to assist in obtaining human body dimensions and/or proportions, for instance of a potential vehicle occupant.

Referring now to the figures and FIG. 1 in particular, there is depicted a schematic view of an exemplifying body parameters supporting system 1 of a vehicle 2 according to embodiments of the disclosure. The body parameters supporting system 1 is adapted for supporting obtaining of body parameters of a person 3. The exemplifying person 3 may refer to any arbitrary person, and for instance be represented by a potential driver and/or passenger of the vehicle 2. The person 3 may further be an authorized person, authorized to have access to the vehicle 2 for instance via an optional electronic user device 4 adapted to communicate with the vehicle 2 in a known manner such as via BLUETOOTH® and/or via a commonly known remote automotive cloud, server and/or back-end system. The optional electronic user device 4 may refer to any arbitrary electronic user device supporting communication with the vehicle 2, and for instance be represented by a smartphone, tablet etc., or equivalents and/or successors thereof. The vehicle 2, on the other hand, may for instance be represented by a passenger car, whereas a body parameter for instance may be represented by an arm length, a leg length, a body height, an eye position, a torso length, etc.

The expression "body parameters supporting system" may refer to "body parameters obtaining system", "body parameters determining system" and/or "body parameters assisting system", whereas "of" a vehicle may refer to "comprised in" a vehicle. The referred to "vehicle" may be represented by any arbitrary vehicle, for instance an engine-propelled vehicle, such as e.g. a car, truck, lorry, van, tractor and/or bus. "Vehicle" may further refer to "autonomous and/or at least partly autonomous vehicle". The expression "supporting" obtaining of body parameters may refer to "assisting in" and/or "enabling" obtaining of body parameters, whereas "for supporting" obtaining if body parameters according to an example may refer to "for guiding and/or instructing a person through" obtaining of body parameters. According to another example, the expression "for supporting obtaining of body parameters of a person" may refer to "for supporting obtaining of and/or determination of body parameters of a person and adjustment of adjustable vehicle components based thereon". The expression "obtaining of" body parameters may refer to "determination of" and/or "deriving" body parameters, and further to "obtaining of one or more" body parameters. "Body" parameters, on the other hand, may refer to "human body" parameters, whereas body "parameters" may refer to body "proportions", "dimensions" and/or "limb(s) lengths". The expression body parameters of a "person" may refer to body parameters of a "potential and/or future vehicle occupant", "vehicle occupant", "driver", "passenger", "person associated with the vehicle", "identified person", "authorized person" and/or "person authorized via an electronic user device associated with the person".

The body parameters supporting system 1 is—by means of a conditions determining unit 105 (shown in FIG. 2)—with input from one or more surrounding detecting sensors 21 adapted to capture a surrounding exterior of the vehicle 2, adapted for determining one or more body parameters capturing conditions for a person 3 present outside the vehicle 2. Thereby, there may be established prevailing conditions for capturing body parameters of a human in the field of view of at least a first sensor 21 adapted to sense a surrounding outside the vehicle 2. In other words, a check is carried out of circumstances e.g. obstructions for obtaining body parameters of a person 3. Subsequently it may be derived from the body parameters capturing conditions for instance whether one or more body parameters are not possible to capture, obtain and/or determine, and/or whether one or more body parameters are not possible to capture, obtain and/or determine to an extent deemed sufficient.

Optionally, the one or more body parameters capturing conditions may comprise at least one of a body position, a body and/or limb posture, a body and/or limb obstruction, a disturbing obstacle, a weather condition, and a light condition. Thereby, sufficient conditions which may affect obtaining and/or determination of body parameters may be determined and subsequently considered and/or analysed. For instance, a geographical position of the person 3 may be insufficient for obtaining and/or determining body parameters of said person 3, the person 3 may e.g. be standing too far away from or too close to the one or more surrounding detecting sensors 21, and/or at an insufficient angle relative thereto 21. In a similar manner, a body posture and/or body limb posture of the person 3 may be insufficient for obtaining and/or determining body parameters of said person 3, said posture may e.g. disable certain body parameters from being obtainable and/or determinable such as e.g. a leg length should the person 3 bend his/her knee(s). Similarly, a body obstruction and/or body limb obstruction, such as e.g. a piece of clothing such as a coat, a bag, a hat etc., may disable sufficient obtaining and/or determining of body parameters of the person 3, whereas a disturbing obstacle such as e.g. an obstacle and/or another person in the background—and/or a piece of clothing of a disadvantaged colour and/or pattern worn by the person 3—in a similar manner may disable sufficient obtaining and/or determining of body parameters of the person 3. Similarly, a weather condition such as e.g. rain and/or snow may disable sufficient obtaining and/or determining of body parameters of the person 3, whereas a light condition such as e.g. glare and/or insufficient ambient light etc. in a similar manner may disable sufficient obtaining and/or determining of body parameters of the person 3. The expression "body position" may refer to "geographical body position", "insufficient body position", "body position of the person" and/or "body position relative the vehicle and/or at least one of the one or more surrounding detecting sensors", whereas "body and/or limb posture" may refer to "body and/or limb standing position", "insufficient body and/or limb posture" and/or "body and/or limb posture of the person". "Body and/or limb obstruction", on the other hand, may refer to "body and/or limb obstruction disturbing and/or interfering with obtaining and/or determining body parameters of the person" and/or "item, clothing, object and/or obstacle obstructing at least a portion of a limb and/or the body of the person", whereas "disturbing obstacle" may refer to "disturbing surrounding obstacle" and/or "surrounding obstacle and/or object disturbing and/or interfering with obtaining and/or determining body parameters of the person". The expression "weather condition" may refer to "weather obstruction", "weather-related obstruction", "obstructing weather condition" and/or "weather disturbing and/or interfering with obtaining and/or determining body parameters of the person", whereas "light condition" may refer to "ambient light condition", "insufficient light condition", "light-related obstruction" and/or "light condition disturbing and/or interfering with obtaining and/or determining body parameters of the person".

Determining one or more body parameters capturing conditions with input from the surrounding detecting sensor(s) 21 may be accomplished for instance by analyzing captured data—e.g. image data—associated with the person, derived from data captured by the surrounding detecting sensor(s) 21. The one or more surrounding detecting sensors 21 adapted to capture a surrounding exterior of the vehicle 2 may refer to any arbitrary surrounding detecting sensors commonly known in the art, and accordingly, said sensor(s) 21 may refer to commonly known sensors adapted to capture a surrounding exterior of the vehicle 2, such as e.g. one or more cameras, radars, LIDARS, etc. The one or more surrounding detecting sensors 21 may be positioned in any arbitrary manner considered relevant to capture a surrounding—and/or at least a portion of a surrounding—exterior of the vehicle 2, and for instance be comprised in and/or be attached to the vehicle 2, such as e.g. the front thereof.

The expression "determining" with input from one or more surrounding detecting sensors may refer to "deriving", "analyzing" and/or "calculating" with input from one or more surrounding detecting sensors, whereas "with input from" one or more surrounding detecting sensors may refer to "with support from" and/or "using" one or more surrounding detecting sensors. "Input", on the other hand, may refer to "data" and/or "captured data", whereas "surrounding detecting sensors" may refer to "environment detecting sensors", "surrounding capturing sensors" and/or "surrounding detecting subsystems". The expression surrounding detecting sensors adapted to "capture" a surrounding exterior of the vehicle may refer to surrounding detecting sensors adapted to "sense" a surrounding exterior of the vehicle, whereas "a surrounding" may refer to "at least a portion of a surrounding". Surrounding "exterior of" the vehicle, on the other hand, may refer to surrounding "outside" and/or "external" the vehicle. The expression body parameters "capturing" conditions may refer to body parameters "prevailing capturing", "obtaining" and/or "determining" conditions, whereas body parameters capturing "conditions" may refer to body parameters capturing "obstructions", "circumstances" and/or "difficulties". "For" a person, on the other hand, may refer to "in relation to" and/or "in view of" a person, whereas "present outside" the vehicle may refer to "present in vicinity of" and/or "present in a field of view of at least one of the one or more surrounding detecting sensors of" the vehicle.

The body parameters supporting system 1 is—by means of a instructions communicating unit 106 (shown in FIG. 2)—adapted for communicating one or more instruction signals 5 indicating one or more body motion and/or obstruction removal instructions, wherein the one or more instruction signals 5 are determined in consideration of counteracting, changing and/or overcoming at least one of the one or more body parameters capturing conditions. Thereby, by establishing instruction signal(s) 5 based on the previously established prevailing conditions for obtaining and/or determining body parameters of the person 3, and subsequently providing the instruction signal(s) 5, guidance may be provided by the body parameters supporting system 1 indicating how the person 3 may move, act and/or behave to improve the circumstances for capturing body parameters of said person 3. Subsequently, guidance is provided prompting the person 3 to perform body motion(s) and/or obstruction(s) removal as a measure to counteract, change and/or overcome prevailing circumstances, which for instance may be deemed unsatisfying and/or insufficient, for capturing body parameter(s). Accordingly, the person 3 may be guided how to move, act and/or behave—and/or which potential obstruction(s) to remove—to improve the circumstances under which body parameters with support from the one or more surrounding detecting sensors 21 may be obtained and/or determined. Thus, provided that the person 3 at least partly follows at least one of the one or more instructions, body parameter(s) which were previously not possible to obtain and/or determine—and/or not possible to obtain and/or determine sufficiently—may then potentially be obtainable and/or determinable.

Optionally, the one or more instructions signals may comprise at least one of a geographical motion instruction, a body limb motion instruction, a body rotation instruction, and/or an obstruction removal instruction. Thereby, sufficient instructions may be communicated and subsequently potentially followed by the person 3 to accomplish improved obtaining and/or determination of body parameters. For instance, a geographical motion instruction may comprise an instruction aimed at the person 3 to move to a specific and/or specified geographical position deemed suitable for capturing and/or determining body parameters, such as e.g. at a specific distance from—and/or angle towards—one or more of the one or more surrounding detecting sensors 21, to thereby enable improved obtaining and/or determining of body parameters of said person 3. Additionally or alternatively, a geographical motion instruction may comprise an instruction aimed at the person 3 to move out of rainy and/or snowy weather, and/or move away from a disturbing obstacle e.g. in the background, to thereby enable improved obtaining and/or determining of body parameters of said person 3. In a similar manner, a body limb motion instruction may comprise an instruction aimed at the person 3 to reposition a limb, such as e.g. straightening and/or holding out a leg or arm, in a manner deemed suitable for capturing relevant body parameters, to thereby enable improved obtaining and/or determining of body parameters of said person 3. Similarly, a body rotation instruction may comprise an instruction aimed at the person 3 to at least partially rotate his or her body, to thereby enable improved obtaining and/or determining of body parameters of said person 3. In a similar manner, an obstruction removal instruction may comprise an instruction aimed at the person 3 to remove and/or reposition e.g. an obstacle, clothing, item, bag and/or object blocking and/or obstructing at least a portion of the person 3 and/or disturbing and/or interfering with obtaining body parameters of the person such as e.g. an object in the background.

The one or more instruction signals 5 may be communicated in any arbitrary manner deemed suitable for the situation at hand. The expression "communicating" one or more instruction signals may refer to "providing", "transmitting", "emitting", "signalling", "initiating" and/or "performing" one or more instruction signals, whereas "instruction" signals may refer to "guidance" and/or "reposition" signals. "One or more instruction signals", on the other hand, may refer to "instruction data", "instruction output" and/or "instruction information". Moreover, "instruction signals" may refer to "instruction signals relevant for the person" and/or "instructions signals to prompt the person to perform one or more body motions". The expression instruction signals "indicating" one more body motion and/or obstruction removal instructions, on the other hand, may refer to instruction signals "indicative of", "corresponding to", "comprising" and/or "signalling" one or more body motion and/or obstruction removal instructions, whereas instruction signals "indicating one or more body motion and/or obstruction removal instructions" may refer to instruction signals "prompting the person to perform one or more body motions and/or obstruction removals". The expression body "motions" may refer to body "motions and/or movements", whereas "body" motions may refer to "body and/or body limb(s)" motions. Similarly, the expression "obstruction" removal may refer to "item, clothing and/or obstacle" removal, whereas obstruction "removal" may refer to obstruction "removal, rearrangement and/or elimination". "Determined" in consideration of counteracting, changing and/or overcoming may refer to "derived", "selected" and/or "defined" in consideration of counteracting, changing and/or overcoming, whereas "in consideration of" counteracting, changing and/or overcoming may refer to "based on", "with the attempt to", "to correspond to the one or more instruction signals for" and/or "to instruct and/or prompt the person to perform one or more body motions and/or obstruction removals for" counteracting, changing and/or overcoming.

Optionally, communicating the one or more instruction signals 5 may comprise transmitting the one or more instruction signals 5 to an electronic user device 4 associated with the person 3. Thereby, and as further shown in FIG. 4, via a display 41 and/or one or more loud speakers (not shown) of a user device 4, guidance may be provided represented by one or more instructions indicating how the person 3 may move, act and/or behave to improve the circumstances for capturing body parameters of said person 3. Subsequently, represented by suggestive instructions provided via said display 41 and/or said one or more loud speakers, representative guidance may be provided via the user device 4, derived from the transmitted one or more instruction signals 5, prompting the person 3 to perform body motion(s) and/or obstruction(s) removal as a measure to counteract, change and/or overcome prevailing circumstances, which for instance may be deemed unsatisfying and/or insufficient, for capturing body parameter(s). Accordingly, the person 3 may be guided via the user device 4 how to move, act and/or behave—and/or which potential obstruction(s) to remove—to improve the circumstances under which body parameters with support from the one or more surrounding detecting sensors 21 may be obtained and/or determined. Thus, provided that the person 3 at least partly follows at least one of the one or more instructions provided via the user device 4, body parameter(s) which were previously not possible to obtain and/or determine—and/or not possible to obtain and/or determine sufficiently—may then potentially be obtainable and/or determinable.

Transmitting the one or more instruction signals 5 to the optional user device 4 associated with the person 3 may be accomplished in any arbitrary manner known in the art, e.g. directly from the vehicle 2 to the user device 4 and/or via the remote automotive cloud, server and/or back-end system discussed above.

The expression "transmitting" the one or more instruction signals may refer to "providing" and/or "transmitting wirelessly" the one or more instruction signals, and according to an example further to "authenticating the person and transmitting" the one or more instruction signals. Such an exemplifying "authenticating" may be accomplished in any arbitrary manner known in the art, for instance in a known manner via the user device and/or software and/or an application running thereon, and/or via the remote automotive cloud, server and/or back-end system discussed above. The expression user device "associated with the person", on the other hand, may refer to user device "via which the person is authenticated" and/or user device "carried by and/or deemed to be carried by the person.

Additionally or alternatively, according to an example, communicating the one or more instruction signals 5 may comprise emitting—with support from one or more optional light emitting devices 22 and/or sound emitting devices 23 of the vehicle 2—a light output and/or a sound output representing the one or more instruction signals 5. Thereby, by means of at least a first light emitting device 22 and/or sound emitting device 23 of the vehicle 2, guidance may be provided represented by a light output and/or sound output indicating how the person 3 may move, act and/or behave to improve the circumstances for capturing body parameters of said person 3. Subsequently, represented by suggestive light output and/or sound output, representative guidance may be provided from the vehicle 2 prompting the person 3 to perform body motion(s) and/or obstruction(s) removal as a measure to counteract, change and/or overcome prevailing circumstances, which for instance may be deemed unsatisfying and/or insufficient, for capturing body parameter(s). Accordingly, the person 3 may be guided by means of a light output and/or sound output from the vehicle 2 how to move, act and/or behave—and/or which potential obstruction(s) to remove—to improve the circumstances under which body parameters with support from the one or more surrounding detecting sensors 21 may be obtained and/or determined. Thus, provided that the person 3 at least partly follows at least one of the one or more instructions emitted by the one or more light emitting devices 22 and/or sound emitting devices 23, body parameter(s) which were previously not possible to obtain and/or determine—and/or not possible to obtain and/or determine sufficiently—may then potentially be obtainable and/or determinable.

The exemplifying optional referred to light emitting device(s) 22 may refer to any arbitrary light emitting device(s) mounted to and/or comprised in the vehicle 2, such as for instance commonly known light sources, head lamps and/or lights e.g. provided in the front of the vehicle 2. Said light emitting device(s) 22 may according to an example comprise one or more lasers, and moreover further together with e.g. DLP (digital light processing) technologies enabling for creating and/or projecting text, icons and/or moving animations. Additionally or alternatively, the light emitting device(s) 22 may comprise a plurality of commonly known LEDs (light emitting diodes) adapted for emitting light which may be seen outside the vehicle such as in front of said vehicle 2. Similarly, the exemplifying optional referred to sound emitting device(s) 23 may refer to any arbitrary sound emitting device(s) mounted to and/or comprised in the vehicle 2, such as for instance commonly known loud speakers adapted for emitting sound(s) which may be heard outside the vehicle 2 such as in front of said vehicle 2. The referred to "a light output" may refer to "light indication(s)", "a light sequence" and/or "light symbol(s) corresponding to at least one of the one or more instruction signal(s)", such as for instance an arrow, animation and/or a light sequence formed e.g. by the exemplifying LEDs and/or lasers to guide the person 3 to perform body motion(s) and/or obstruction(s) removal in accordance therewith. Similarly, the referred to "a sound output" may refer to "sound instruction(s)", "a sound sequence" and/or "voice and/or speech instruction(s) corresponding to at least one of the one or more instruction signal(s)", such as for instance a voice instruction to guide the person 3 to perform body motion(s) and/or obstruction(s) removal in accordance therewith.

The body parameters supporting system 1 may—by means of an optional suitable position determining unit 102 (shown in FIG. 2)—be adapted for determining a geographical position 6 suitable for capturing body parameters of the person 3. The body parameters supporting system 1 may then further—by means of an optional movement instruction communicating unit 103 (shown in FIG. 2)—be adapted for communicating a movement instruction signal 7 indicating a movement instruction corresponding to the suitable position 6. Thereby, by establishing an appropriate geographical position 6 deemed suitable for the person 3 to be standing and/or be located for obtaining of and/or determination of body parameters, and providing an instruction 7 corresponding to said position 6, the person 3 may be guided thereto 6.

The suitable position 6 may be any arbitrary position deemed suitable for capturing and/or determination of body parameters of the person 3, and may for instance refer to a position 6 a few metres in front of the vehicle 2 to suit capturing of body parameters by one or more surrounding detecting sensors 21 comprised in e.g. a grill of the vehicle 2. The movement instruction signal 7 may be communicated in any arbitrary manner deemed suitable for the situation at hand. For instance, communicating the movement instruction signal 7 may comprise transmitting the movement instruction signal 7 to the electronic user device 4 discussed above. Thereby, and as further shown in FIG. 4, via the display 41 and/or the one or more loud speakers (not shown) of the user device 4, guidance may be provided represented by a movement instruction indicating the position 6—and/or how to get to the position 6—deemed suitable for obtaining and/or determining body parameters. Subsequently, represented by one or more suggestive instructions provided via said display 41 and/or said one or more loud speakers, representative guidance may be provided via the user device 4, derived from the transmitted movement instruction signal 7, prompting the person 3 to move to and/or how to get to the suitable position 6. Thus, provided that the person 3 follows the movement instructions provided via the user device 4, body parameter(s) may then potentially be obtainable and/or determinable.

Additionally or alternatively, according to an example, communicating the movement instruction signal 7 may comprise emitting—with support from the one or more optional light emitting devices 22 and/or the one or more sound emitting devices 23 of the vehicle discussed above—a light output and/or a sound output representing the movement instruction signal 7. Thereby, by means of at least a first light emitting device 22 and/or sound emitting device 23 of the vehicle 2, guidance may be provided represented by a light output and/or sound output indicating the position 6—and/or how to get to the position 6—deemed suitable for obtaining and/or determining body parameters. Subsequently, represented by suggestive light output and/or sound output emitted from at least one of the one or more light emitting devices 22 and/or at least one of the one or more sound emitting devices 23, representative guidance may be provided from the vehicle 2, derived from the transmitted movement instruction signal 7, prompting the person 3 to move to and/or guiding the person 3 how to get to the suitable position 6. Thus, provided that the person 3 follows the movement instructions provided via the one or more light emitting devices 22 and/or the one or more sound emitting devices 23 of the vehicle 2, body parameter(s) may then potentially be obtainable and/or determinable. The referred to "a light output" may refer to "light indication(s)", "a light sequence" and/or "light symbol(s) corresponding to the movement instruction signal", such as for instance an arrow, animation and/or a light sequence formed e.g. by the exemplifying LEDs and/or lasers to guide the person to the suitable position. Similarly, the referred to "a sound output" may refer to "sound instruction(s)", "a sound sequence" and/or "voice and/or speech instruction(s) corresponding to the movement instruction signal", such as for instance a voice instruction to guide the person 3 to the suitable position.

The expression "determining" a geographical position may refer to "determining with input from at least one of the one or more surrounding detecting sensors" a geographical position, whereas "geographical position" may refer to "geographical position in vicinity of the vehicle and/or in a field of view of at least one of the one or more surrounding detecting sensors". "Position suitable" for capturing body parameters of the person, on the other hand, may refer to "position deemed suitable" and/or "position relevant for" capturing body parameters of the person, whereas "capturing" body parameters of the person may refer to "determining" and/or "obtaining" body parameters of the person. The expression "communicating" a movement instruction signal may refer to "providing", "transmitting", "emitting", "signalling", "initiating" and/or "performing" a movement instruction signal, whereas "movement instruction" signal may refer to "movement guidance" and/or "suitable position guidance" signal. Moreover, "movement instruction signal" may refer to "movement instruction signal relevant for the person" and/or "instruction signal to prompt the person to move to the suitable position". The expression movement instruction signal "indicating" a movement instruction corresponding to the suitable position, on the other hand, may refer to movement instruction signal "indicative of", "corresponding to", "comprising" and/or "signalling" a movement instruction corresponding to the suitable position, whereas movement instruction signal "indicating a movement instruction corresponding to the suitable position" may refer to movement instruction signal "prompting the person to move to the suitable position".

Additionally or alternatively, optionally, the body parameters supporting system 1 may further—by means of an optional light indication communicating unit 104 (shown in FIG. 2)—be adapted for communicating with support from one or more light emitting devices 22 of the vehicle, a light indication 8 on the ground corresponding to the suitable position 6. Thereby, a light indication 8 directed to the ground may indicate the determined position 6 suitable for the person 3 to be standing and/or be located for obtaining of and/or determination of body parameters, thus providing guidance thereto 6. That is, by means of at least a first light emitting device 22, guidance may be provided represented by a light indication 8 on the ground indicating said suitable position 6. Subsequently, represented by a ground-directed light indication 8 emitted from at least one of the one or more light emitting devices 22, representative guidance may be provided—derived from the transmitted movement instruction signal 7—by pointing out the suitable position 6. Thus, provided that the person 3 moves to the light indication 8, body parameter(s) may then potentially be obtainable and/or determinable.

The ground-provided light indication 8 may be of any arbitrary shape and/or dimensions, for instance have the shape of a circle, oval, cross, square, rectangle, dot, pair of feet, etc.

The expression "communicating" with support from one or more light emitting devices may refer to "emitting", "projecting", "providing", "indicating" and/or "signalling" with support from one or more light emitting devices, whereas "light indication" may refer to "light marking(s) and/or projection(s)" and/or "lit up section and/or area". The expression "corresponding to" the suitable position, on the other hand, may refer to "reflecting", "marking out" and/or "pointing out" the suitable position.

The body parameters supporting system 1 may—by means of an optional body parameters determining unit 107 (shown in FIG. 2)—be adapted for determining with input from the one or more surrounding detecting sensors 21 one or more body parameters of the person 3. Thereby, one or more body parameters of the person 3 may be determined, and potentially subsequently be used for adjusting—and/or initiating adjustment of—one or more adjustable components 24 of the vehicle 2, such as for instance an exemplifying exterior mirror position.

Determining one or more body parameters of the person 3 may be accomplished in any arbitrary manner commonly known in the art, for instance by analysing data, e.g. image data, associated with the person 3 captured by the one or more surrounding detecting sensors 21. Similarly, potentially adjusting one or more adjustable components 24 of the vehicle 2 may be accomplished in any arbitrary known manner, for instance may one or more determined body parameters be communicated to one or more applicable adjustable components 24 and/or to electronic control unit(s) associated therewith 24 for utilization and/or implementation thereof. An adjustable component 24 may for instance be represented by and/or comprise one or more of: a seat cushion position, seat cushion length, neck rest position, seat belt position, back rest angle including optional side supports, back rest angle upper part, power lumbar support, pedal position, steering wheel position, interior mirror position, exterior mirrors' position, gear shifter position, position of head-up display projection on windscreen, position of other displays, position of controls for media, climate, navigation etc., position of control located on steering wheel, position of arm support, position of up holder, direction of AC (air conditioning) output, sunblind, settings for a deployable airbag and opening angle of tailgate.

The expression "determining" with input from one or more surrounding detecting sensors may refer to "deriving" with input from one or more surrounding detecting sensors, whereas "with input from" one or more surrounding detecting sensors may refer to "with support from" and/or "with input derived from" the one or more surrounding detecting sensors.

The body parameters supporting system 1 may—by means of an optional session initiating unit 101 (shown in FIG. 2)—be adapted for receiving a session initiating signal 9 requesting the body parameters supporting system 1 to initiate a body parameters obtaining session. Thereby, a session may be initiated for providing instructions and/or guidance aimed at the person 3 for—and/or for instructing and/or guiding a person 3 through a process of—obtaining of and/or determination of body parameters as described above, and as will be further described in conjunction with Actions 1002-1007 of FIG. 3.

The session initiating signal 9 may be received in any arbitrary known manner, for instance—and as shown in FIG. 4—from the optional user device 4 described above, and/or from a manual initiation e.g. via a user interface such as a display and or button (not shown) of the vehicle 2.

The expression "receiving" a session initiating signal may refer to "deriving" a session initiating signal and/or "receiving from an electronic user device" a session initiating signal. "Session initiating" signal, on the other hand, may refer to "guiding initiating" signal, "session initiating instruction" signal and/or "instruction(s) provision initiating" signal whereas session initiating "signal" may refer to session initiating "data" and/or "information". The expression "requesting the body parameters supporting system to initiate" a body parameters obtaining session may refer to "initiating" a body parameters obtaining session, whereas "a body parameters obtaining session" may refer to "body parameters obtaining session for a person", "instruction(s) provision", "communicating guiding instruction(s)" and/or "communicating instruction(s) relevant for the person for obtaining of and/or determining of body parameters".

The body parameters supporting system 1 may—by means of an optional session completed indicating unit 108 (shown in FIG. 2)—be adapted for communicating, upon a body parameters obtaining session being deemed completed—with support from one or more light emitting devices 22 and/or sound emitting devices 23 of the vehicle—a light output and/or sound output indicative of the body parameters obtaining session being deemed completed. Thereby, it may be signalled by means of at least one of the one or more light emitting devices 22 and/or at least a one of the one or more sound emitting devices 23 of the vehicle 2, that a session for providing instructions and/or guidance aimed at the person 3 for—and/or for instructing and/or guiding a person 3 through a process of—determination of body parameters as described above, and as will be further described in conjunction with Actions 1002-1007 of FIG. 3, has been completed and/or has come to an end.

The referred to "light output" may refer to "light indication", "light sequence" and/or "light symbol corresponding to the body parameters obtaining session being deemed completed", such as for instance a light blinking a predetermined number of times. Similarly, the referred to "sound output" may refer to "sound verification", "sound sequence"

and/or "sound corresponding to the body parameters obtaining session being deemed completed", such as for instance a predetermined sound and/or sound sequence e.g. a predetermined number of honking sounds.

The expression "communicating" a light output and/or sound output may refer to "emitting", "signalling" and/or "indicating" a light output and/or sound output, whereas "upon a body parameters obtaining session being deemed completed" may refer to "when a body parameters obtaining session is completed and/or has ended" and/or "upon completion of determining body parameters". "Indicative of" the body parameters obtaining session being deemed completed, on the other hand, may refer to "corresponding to" and/or "representing" the body parameters obtaining session being deemed completed, whereas indicative of "the body parameters obtaining session being deemed completed" may refer to indicative of "determining of body parameters being deemed completed". "Deemed completed" may refer to merely "completed".

Figure 2:
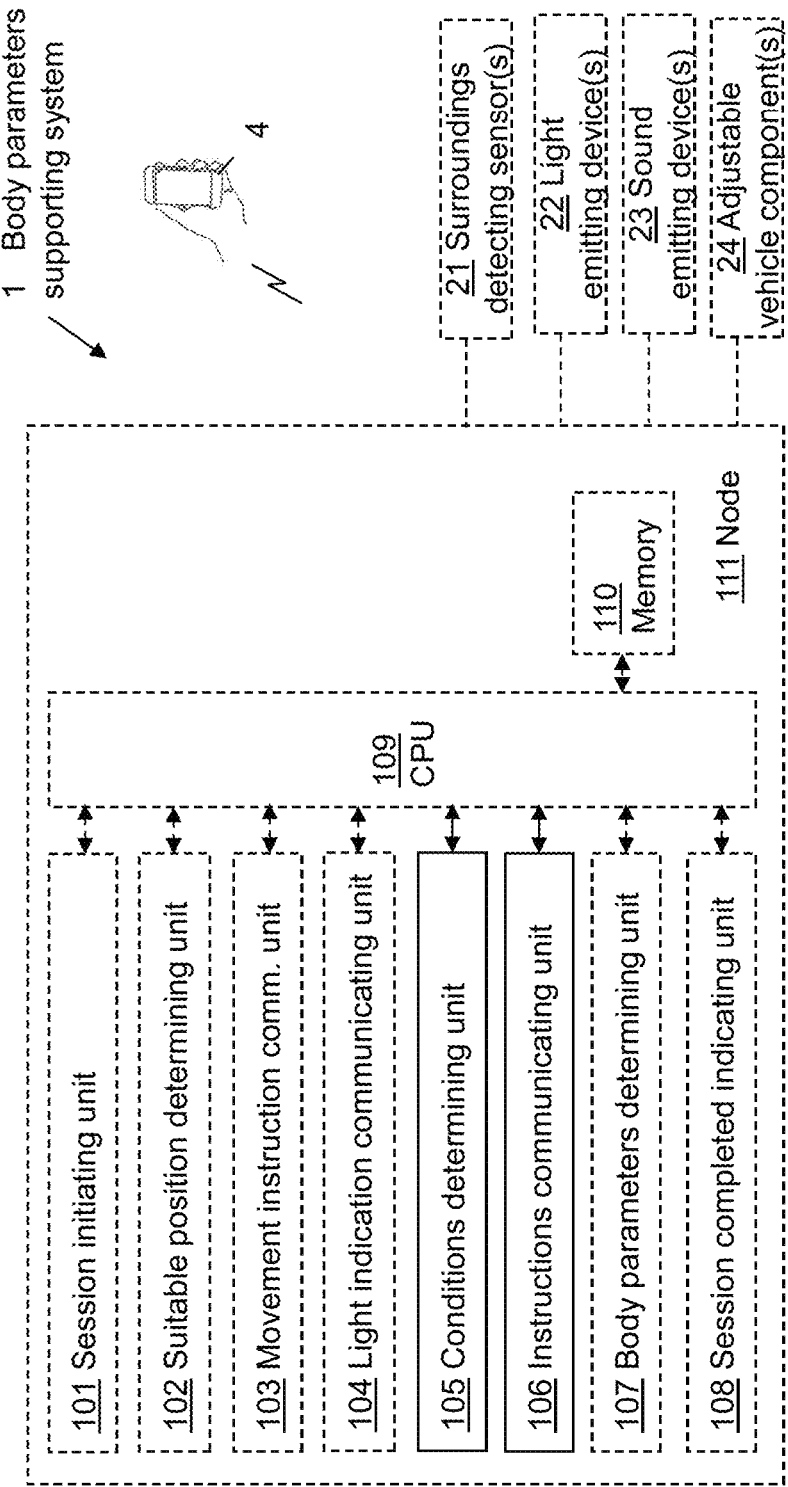
FIG. 2 is a schematic block diagram illustrating an exemplifying body parameters supporting system according to embodiments of the disclosure.

As further shown in FIG. 2, which is a schematic block diagram illustrating an exemplifying body parameters supporting system 1 according to embodiments of the disclosure, the body parameters supporting system 1 comprises as indicated in conjunction with FIG. 1 an optional session initiating unit 101, an optional suitable position determining unit 102, an optional movement instruction communicating unit 103, an optional light indication communicating unit 104, a conditions determining unit 105, an instructions communicating unit 106, an optional body parameters determining unit 107, and an optional session completed indicating unit 108, all of which were described in greater detail in conjunction with FIG. 1. Furthermore, the embodiments herein for supporting obtaining of body parameters of a person 3, may be implemented through one or more processors, such as a processor 109, here denoted CPU (central processing unit), together with computer program code for performing the functions and actions of the embodiments herein. Said program code may also be provided as a computer program product, for instance in the form of a data carrier carrying computer program code for performing the embodiments herein when being loaded into the body parameters supporting system 1. One such carrier may be in the form of a CD ROM disc and/or a hard drive. It is however feasible with other data carriers such as a memory stick. The computer program code may furthermore be provided as pure program code on a server and downloaded to the body parameters supporting system 1. The body parameters supporting system 1 may further comprise a memory 110 comprising one or more memory units. The memory 110 may be arranged to be used to store e.g. information, and further to store data, configurations, schedulings, and applications, to perform the methods herein when being executed in the body parameters supporting system 1. For instance, the computer program code may be implemented in the firmware, stored in FLASH memory 110 of an embedded processor 109, and/or downloaded from online.

Furthermore, the optional session initiating unit 101, the optional suitable position determining unit 102, the optional movement instruction communicating unit 103, the optional light indication communicating unit 104, the conditions determining unit 105, the instructions communicating unit 106, the optional body parameters determining unit 107, the optional session completed indicating unit 108, the optional processor 109 and/or the optional memory 110, may at least partly be comprised in one or more nodes 111 e.g. ECUs (electronic control units) of the vehicle 2. Those skilled in the art will also appreciate that said units 101, 102, 103, 104, 105, 106, 107, 108 described above may refer to a combination of analog and digital circuits, and/or one or more processors configured with software and/or firmware, e.g. stored in a memory such as the memory 110, that when executed by the one or more processors such as the processor 109 perform as was described in conjunction with FIG. 1 and as will be described further in conjunction with FIG. 3. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Further shown in FIG. 2 is the optional user device 4, the one or more surrounding detecting sensors 21, the optional one or more light emitting devices 22, the optional one or more sound emitting devices 23 and the optional adjustable vehicle component(s) 24.

Figure 3:
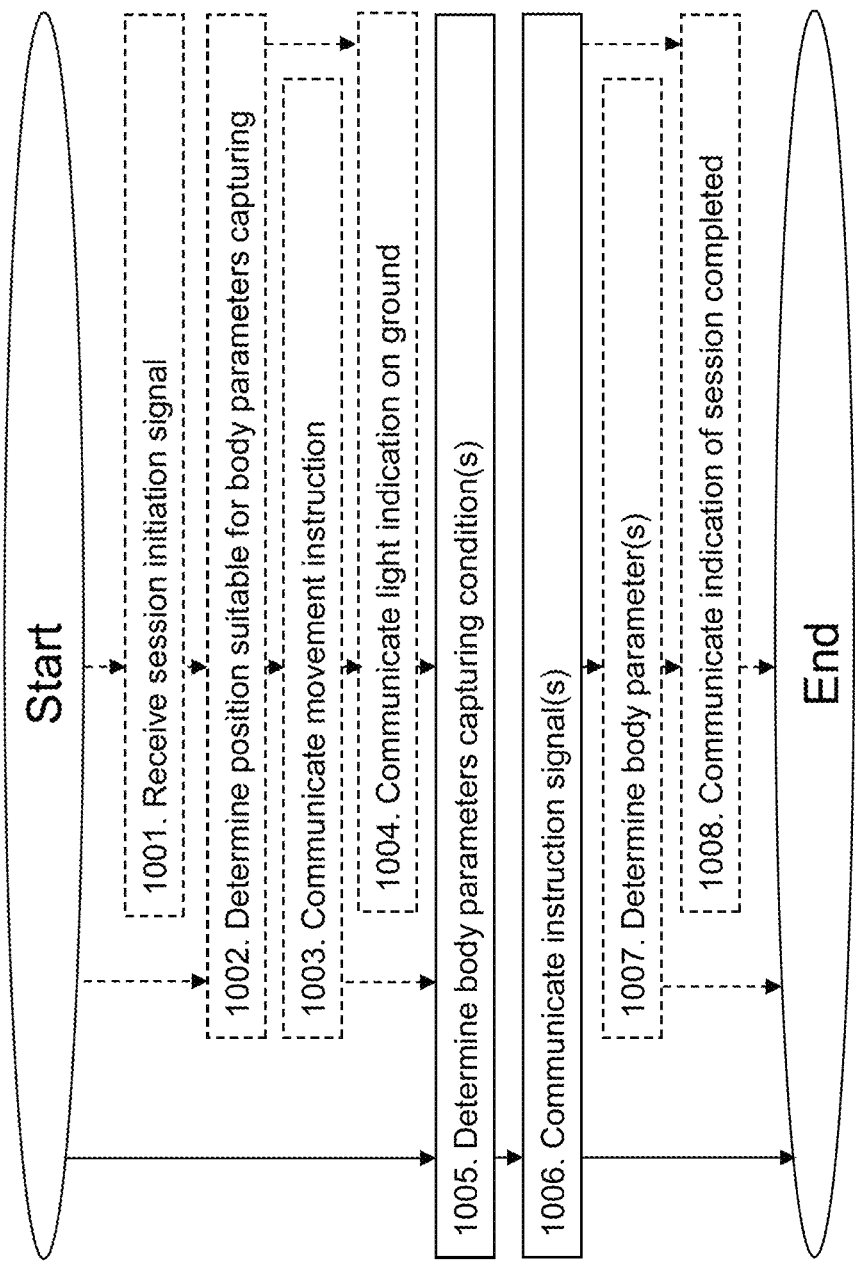
FIG. 3 is a flowchart depicting an exemplifying method performed by a body parameters supporting system according to embodiments of the disclosure.

FIG. 3 is a flowchart depicting an exemplifying method performed by a body parameters supporting system 1 according to embodiments of the disclosure. Said method is for supporting obtaining of body parameters of a person 3, e.g. of a potential vehicle occupant. The exemplifying method, which may be continuously repeated, comprises the following actions discussed with support from FIGS. 1-2. Moreover, the actions may be taken in any suitable order and/or one or more actions may be performed simultaneously and/or in alternate order where applicable; for instance, Action 1004 may be performed simultaneously with and/or prior to Action 1003.

Action 1001

In optional Action 1001, the body parameters supporting system 1 may receive—e.g. with support from the optional session initiating unit 101—a session initiating signal 9 requesting the body parameters supporting system 1 to initiate a body parameters obtaining session.

Action 1002

In optional Action 1002, the body parameters supporting system 1 may determine—e.g. with support from the optional suitable position determining unit 102—a geographical position 6 suitable for capturing body parameters of the person 3.

Action 1003

In optional Action 1003, optionally following upon optional Action 1002 of determining a geographical position 6 suitable for capturing body parameters of the person 3, the body parameters supporting system 1 may communicate—e.g. with support from the optional movement instruction communicating unit 103—a movement instruction signal 7 indicating a movement instruction corresponding to the suitable position 6.

Action 1004

In optional Action 1004, optionally following upon optional Action 1002 of determining a geographical position 6 suitable for capturing body parameters of the person 3 and/or following upon optional Action 1003 of communicating a movement instruction signal 7 indicating a movement instruction corresponding to the suitable position 6, the body parameters supporting system 1 may with support from one or more light emitting devices 22 of the vehicle 2 communicate—e.g. with support from the optional light indication communicating unit 104—a light indication 8 on the ground corresponding to the suitable position 6.

Action 1005

In Action 1005, the body parameters supporting system 1 determines—e.g. with support from the conditions determining unit 105—with input from one or more surrounding detecting sensors 21 adapted to capture a surrounding exterior of the vehicle 2, one or more body parameters capturing conditions for a person 3 present outside the vehicle 2.

Optionally, the one or more body parameters capturing conditions may comprise at least one of a body position, a body and/or limb posture, a body and/or limb obstruction, a disturbing obstacle, a weather condition, and a light condition.

Action 1006

In Action 1006, the body parameters supporting system 1 communicates—e.g. with support from the instructions communicating unit 106—one or more instruction signals 5 indicating one or more body motion and/or obstruction removal instructions, wherein the one or more instruction signals 5 are determined in consideration of counteracting, changing and/or overcoming at least one of the one or more body parameters capturing Optionally, the one or more instructions signals 5 may comprise at least one of a geographical motion instruction, a body limb motion instruction, a body rotation instruction, and an obstruction removal instruction Furthermore, optionally, Action 1006 of communicating one or more instruction signals 5 may comprise transmitting the one or more instruction signals 5 to an electronic user device 4 associated with the person 3.

Additionally or alternatively, optionally, Action 1006 of communicating one or more instruction signals 5 may comprise communicating with support from one or more light emitting devices 22 and/or sound emitting devices 23 of the vehicle 2, a light output and/or sound output indicative of the one or more instruction signals 5.

Action 1007

In optional Action 1007, the body parameters supporting system 1 may with input from the one or more surrounding detecting sensors 21 determine—e.g. with support from the optional body parameters determining unit 107—one or more body parameters of the person 3.

Action 1008

In optional Action 1008, the body parameters supporting system 1 may upon a body parameters obtaining session being deemed completed, with support from one or more light emitting devices 22 and/or sound emitting devices 23 of the vehicle 2, communicate—e.g. with support from the optional session completed indicating unit 108—a light output and/or sound output indicative of the body parameters obtaining session being deemed completed.

FIG. 4 illustrates exemplifying guidance provided on a display 41 of an optional user device 4, which guidance is associated with an exemplifying session initiating signal 9 transmitted to the body parameters supporting system 1, further associated with an exemplifying movement instruction signal 7 received from the body parameters supporting system 1, and yet further associated with exemplifying instruction signals 5 received from the body parameters supporting system 1, according to embodiments of the disclosure.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

What is claimed is:

1. A method performed by a body parameters supporting system of a vehicle for supporting obtaining of body parameters of a person, the method comprising:
    determining with input from one or more surrounding detecting sensors adapted to capture a surrounding exterior of the vehicle, one or more body parameters capturing conditions for a person present outside the vehicle, wherein the one or more body parameters capturing conditions comprises at least one of a body and/or limb posture, a body and/or limb obstruction, and a disturbing obstacle;
    communicating one or more instruction signals indicating one or more body motion and/or obstruction removal instructions, wherein the one or more instruction signals are determined in consideration of counteracting, changing and/or overcoming at least one of the one or more body parameters capturing conditions, and wherein the one or more instructions signals comprises at least one of a body limb motion instruction, a body rotation instruction, and an obstruction removal instructions;
    determining with input from the one or more surrounding detecting sensors one or more body parameters of the person; and
    initiating adjustment of one or more adjustable vehicle components of the vehicle based on at least one of the determined one or more body parameters, wherein initiating adjustment of one or more adjustable vehicle components comprises physically actuating the one or more adjustable vehicle components of the vehicle.

2. The method according to claim 1, wherein the communicating one or more instruction signals comprises:
    transmitting the one or more instruction signals to an electronic user device associated with the person; and/or
    communicating by means of one or more light emitting devices and/or sound emitting devices of the vehicle, a light output and/or sound output indicative of the one or more instruction signals.

3. The method according to claim 1, further comprising:
    determining a geographical position suitable for capturing body parameters of the person; and
        communicating a movement instruction signal indicating a movement instruction corresponding to the suitable position; and/or
        communicating with support from one or more light emitting devices of the vehicle, a light indication on the ground corresponding to the suitable position.

4. The method according to claim 3, wherein determining the geographical position suitable for capturing body parameters of the person comprises determining the suitable position with input from the one or more surrounding detecting sensors.

5. The method according to claim 1, further comprising:
    receiving a session initiating signal requesting the body parameters supporting system to initiate a body parameters obtaining session.

6. The method according to claim 1, further comprising:
    communicating upon a body parameters obtaining session being deemed completed, with support from one or more light emitting devices and/or sound emitting devices of the vehicle, a light output and/or sound output indicative of the body parameters obtaining session being deemed completed.

7. The method of claim 1, wherein the one or more adjustable vehicle components comprise:
   a seat;
   a steering wheel;
   a mirror; and
   climate control instruments.

8. A body parameters supporting system of a vehicle for supporting obtaining of body parameters of a person, the body parameters supporting system comprising:
   a conditions determining unit for determining with input from one or more surrounding detecting sensors adapted to capture a surrounding exterior of the vehicle, one or more body parameters capturing conditions for a person present outside the vehicle, wherein the one or more body parameters capturing conditions comprises at least one of a body and/or limb posture, a body and/or limb obstruction, and a disturbing obstacle;
   an instructions communicating unit for communicating one or more instruction signals indicating one or more body motion and/or obstruction removal instructions, wherein the one or more instruction signals are determined in consideration of counteracting, changing and/or overcoming at least one of the one or more body parameters capturing conditions, and wherein the one or more instructions signals comprises at least one of a body limb motion instruction, a body rotation instruction, and an obstruction removal instruction;
   a body parameters determining unit for determining with input from the one or more surrounding detecting sensors one or more body parameters of the person; and
   an adjustment initiating unit for physically actuating one or more adjustable vehicle components of the vehicle based on at least one of the determined one or more body parameters.

9. The body parameters supporting system according to claim 8, wherein the instructions communicating unit is adapted for:
   transmitting the one or more instruction signals to an electronic user device associated with the person; and/or
   communicating by means of one or more light emitting devices and/or sound emitting devices of the vehicle, a light output and/or sound output indicative of the one or more instruction signals.

10. The body parameters supporting system according to claim 8, further comprising:
    a suitable position determining unit for determining a geographical position suitable for capturing body parameters of the person; and
      a movement instruction communicating unit for communicating a movement instruction signal indicating a movement instruction corresponding to the suitable position; and/or
      a light indication communicating unit for communicating with support from one or more light emitting devices of the vehicle, a light indication on the ground corresponding to the suitable position.

11. The body parameters supporting system according to claim 10, wherein the suitable position determining unit is adapted for determining the suitable position with input from the one or more surrounding detecting sensors.

12. The body parameters supporting system according to claim 8, further comprising:
    a session initiating unit for receiving a session initiating signal requesting the body parameters supporting system to initiate a body parameters obtaining session.

13. The body parameters supporting system according to claim 8, further comprising:
    a session completed indicating unit for communicating upon a body parameters obtaining session being deemed completed, with support from one or more light emitting devices and/or sound emitting devices of the vehicle, a light output and/or sound output indicative of the body parameters obtaining session being deemed completed.

14. A vehicle comprising a body parameters supporting system, the body parameters supporting system comprising:
    a conditions determining unit for determining with input from one or more surrounding detecting sensors adapted to capture a surrounding exterior of the vehicle, one or more body parameters capturing conditions for a person present outside the vehicle;
    an instructions communicating unit for communicating one or more instruction signals indicating one or more body motion and/or obstruction removal instructions, wherein the one or more instruction signals are determined in consideration of counteracting, changing and/or overcoming at least one of the one or more body parameters capturing conditions;
    a body parameters determining unit for determining with input from the one or more surrounding detecting sensors one or more body parameters of the person; and
    an adjustment initiating unit for physically actuating one or more adjustable vehicle components of the vehicle based on at least one of the determined one or more body parameters.

15. The vehicle of claim 14, wherein the one or more adjustable vehicle components comprise:
    a seat;
    a steering wheel;
    a mirror; and
    climate control instruments.

16. A non-transitory computer-readable storage medium storing instructions that, when executed, cause one or more processors to:
    determine with input from one or more surrounding detecting sensors adapted to capture a surrounding exterior of a vehicle, one or more body parameters capturing conditions for a person present outside the vehicle, wherein the one or more body parameters capturing conditions comprises at least one of a body and/or limb posture, a body and/or limb obstruction, and a disturbing obstacle;
    communicate one or more instruction signals indicating one or more body motion and/or obstruction removal instructions, wherein the one or more instruction signals are determined in consideration of counteracting, changing and/or overcoming at least one of the one or more body parameters capturing conditions, and wherein the one or more instructions signals comprises at least one of a body limb motion instruction, a body rotation instruction, and an obstruction removal instruction;
    determine with input from the one or more surrounding detecting sensors one or more body parameters of the person; and
    initiate adjustment of one or more adjustable vehicle components of the vehicle based on at least one of the determined one or more body parameters, wherein the instructions that cause the one or more processors to initiate adjustment comprise instructions that cause the one or more processors to physically actuate the one or more adjustable vehicle components of the vehicle.

\* \* \* \* \*